United States Patent
Ueno

(10) Patent No.: US 8,991,940 B2
(45) Date of Patent: Mar. 31, 2015

(54) ELECTRICALLY DRIVEN BRAKE BOOSTER

(75) Inventor: Kentaro Ueno, Minamiarupusu (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 994 days.

(21) Appl. No.: 12/856,233

(22) Filed: Aug. 13, 2010

(65) Prior Publication Data

US 2011/0074209 A1 Mar. 31, 2011

(30) Foreign Application Priority Data

Sep. 30, 2009 (JP) .................. 2009-225922

(51) Int. Cl.
*B60T 8/42* (2006.01)
*B60T 13/74* (2006.01)

(52) U.S. Cl.
CPC .................. *B60T 13/745* (2013.01)
USPC ........................ 303/115.2; 303/20

(58) Field of Classification Search
USPC ......... 303/15, 113.3, 113.4, 114.1, 115.2, 20; 60/545; 73/1.71, 1.62, 1.79, 132, 1.88
See application file for complete search history.

(56) References Cited

U.S. PATENT DOCUMENTS

| | | | | |
|---|---|---|---|---|
| 5,086,641 | A * | 2/1992 | Roselli | 73/1.79 |
| 6,431,662 | B2 * | 8/2002 | Isono et al. | 303/114.3 |
| 6,554,373 | B1 * | 4/2003 | Bill | 303/114.3 |
| 6,952,944 | B1 * | 10/2005 | Ward | 73/1.75 |
| 2008/0059023 | A1 | 3/2008 | Ueno et al. | |
| 2009/0039702 | A1 * | 2/2009 | Nishino et al. | 303/114.1 |
| 2009/0115242 | A1 * | 5/2009 | Ohtani et al. | 303/3 |

FOREIGN PATENT DOCUMENTS

| | | | |
|---|---|---|---|
| JP | 07277174 A * | 10/1995 | B60T 13/68 |
| JP | 2007-112426 A | 5/2007 | |
| JP | 2009227230 A * | 10/2009 | |
| JP | 2012111458 A * | 6/2012 | |

OTHER PUBLICATIONS

Abstract of JP 07-277174.*
Abstract of JP 2009-227230.*
Abstract of JP 2012-111458.*

* cited by examiner

*Primary Examiner* — Nicholas J Lane
(74) *Attorney, Agent, or Firm* — Crowell & Moring LLP

(57) ABSTRACT

In an electrically driven brake booster wherein an electrically driven actuator moves a booster piston upon operation of a brake pedal to generate a hydraulic pressure for driving a brake force at the maser cylinder, the electrically driven actuator controls to move the booster piston as the pressing member in order to correctly detect presence/absence of an operation of the booster piston and detect a movement pattern of an input rot and an input piston as the shaft member relative to a movement of the pressing member. In accordance with the movement pattern, presence/absence of an operation of the brake pedal is detected. By confirming that the brake pedal is not operated, by the method described above, a zero point of a stroke sensor for detecting the position of the shaft member and zero points of oil pressure sensors for detecting a hydraulic pressure supplied by the master cylinder are learnt.

6 Claims, 6 Drawing Sheets

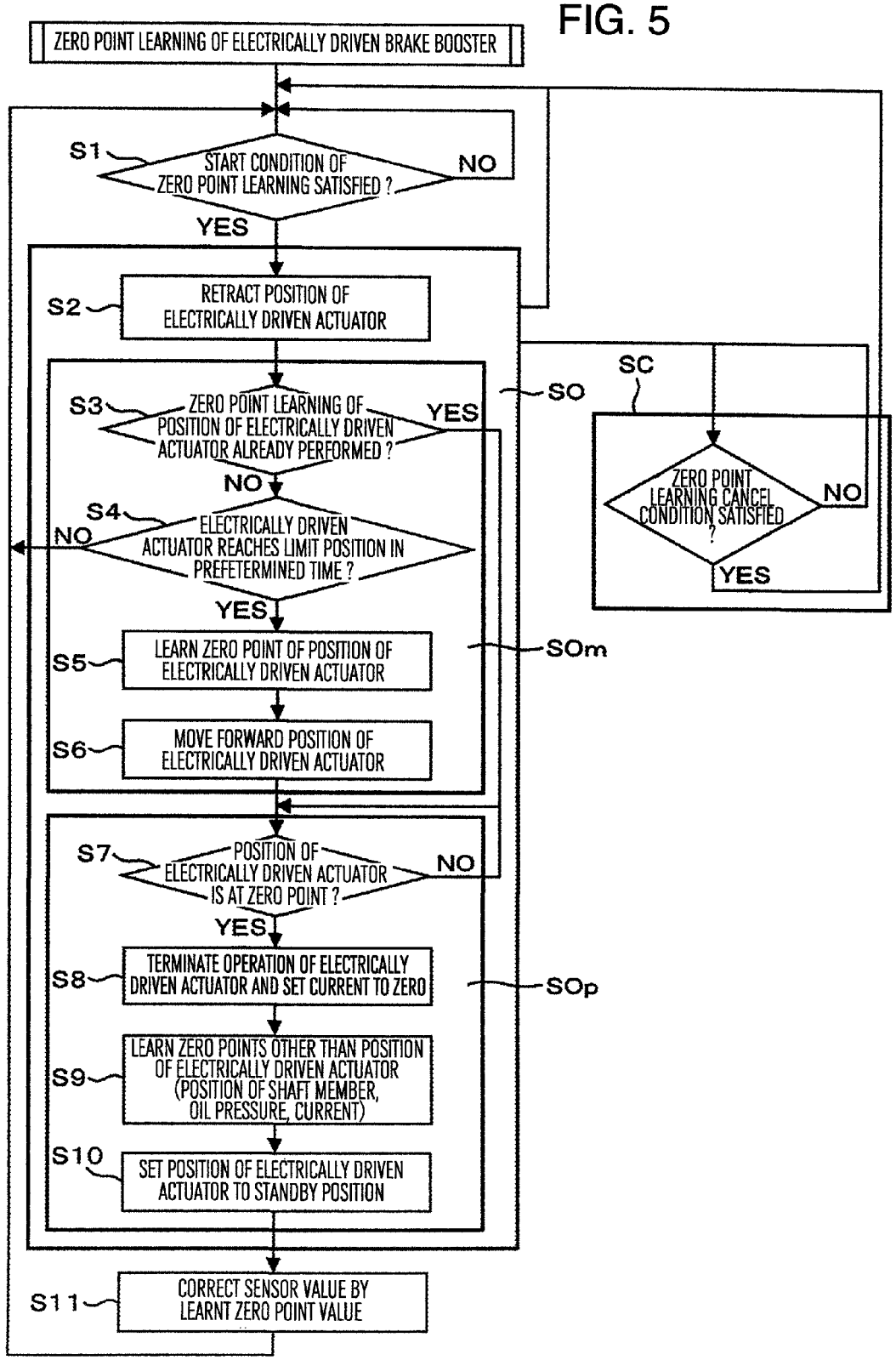

ELECTRICALLY DRIVEN BRAKE BOOSTER

BACKGROUND OF THE INVENTION

The present invention relates to an electrically driven brake booster equipped with an electrically driven actuator for generating a brake force.

A brake is controlled by an electrically driven actuator in accordance with a detected operation amount of a pedal and a detected position of the actuator. Used for detecting parameters for this control are, for example, a displacement sensor for detecting a displacement of a rod for operating a pedal or a brake piston, a rotation sensor for an electrically driven actuator, a hydraulic pressure sensor for detecting a hydraulic pressure for generating a brake force, a current sensor for detecting a current flowing through an electrically driven actuator, and the like. There is a problem that a control reference point in a brake non-operation state and a zero point of each parameter change because output values of a displacement sensor, a revolution sensor, a hydraulic sensor, and a current sensor change with variation and temperature characteristics of a sensor itself, variation and characteristics of a braking mechanism including an electrically driven actuator, and a sensor mount error.

JP-A-2007-1124226 (Patent Document 1) discloses an electrically driven brake booster.

SUMMARY OF THE INVENTION

Patent Document 1 does not mention a detection error, a lowered detection precision or a change or loss of stored reference position information, respectively to be caused by variation, temperature change and the like.

It is important, however, to detect a correct reference point, i.e., a zero point, in order to improve a control precision of a brake booster.

It is an object of the present invention to provide techniques capable of detecting a correct reference point to be used for controlling an electrically driven brake booster.

According to one aspect of the present invention, there is provided an electrically driven brake booster including: a master cylinder for generating a hydraulic pressure to be used for generating a vehicle brake force; a pressing member for controlling a hydraulic pressure generated by the master cylinder; an electrically driven actuator for moving the pressing member forward and backward; a sensor to be used for measuring a movement amount or position of the pressing member; and a controller, wherein: the controller controls the electrically driven actuator in accordance with an operation of a brake pedal to control a hydraulic pressure to be generated by the master cylinder; and the controller obtains a position or a movement reference point of the pressing member through a learning operation.

In addition to the above-described aspect, the electrically driven brake booster, further includes: a fixed member mounted on a fixed position; and a moving member for moving in correspondence with a movement of the pressing member, wherein the controller detects that the moving member reaches a position of the fixed member, and learns the reference point in response to the detection.

In addition to the above-described aspects, in the electrically driven brake booster of the present invention: the fixed member is a first stopper provided along a movement axis of forward and backward movement of the pressing member; the moving member is a second stopper moving together with the pressing member; and the controller learns the reference position point in response to that the second stopper moving together with the pressing member contacts the first stopper.

In addition to the above-described aspects, in the electrically driven brake booster of the present invention, the controller uses as a standby position a position of the pressing member where the master cylinder does not generate a hydraulic pressure for generating the brake force, and the fixed member is provided at a position remote from the master cylinder than the standby position; when an operation state of the brake pedal is changed to a state that the brake pedal is not operated, the controller controls the electrically driven actuator to move the pressing member to the standby position; and in the learning operation, the controller controls the electrically driven actuator so as to make the moving member reach a position of the fixed member.

In addition to the above-described aspects, the electrically driven brake booster of the present invention includes: a master cylinder for generating a hydraulic pressure to be used for generating a vehicle brake force; a pressing member for controlling a hydraulic pressure generated by the master cylinder; an electrically driven actuator for moving the pressing member forward and backward; a pressure sensor to be used for measuring a hydraulic pressure generated by the master cylinder; and a controller, wherein: the controller controls the electrically driven actuator in accordance with an operation of a brake pedal to control a hydraulic pressure to be generated by the master cylinder; and the controller detects a state that the brake pedal is not operated, and in response to the detection, a zero point of the pressure sensor is detected through a learning operation.

In addition to the above-described aspects, in the electrically driven brake booster of the present invention, the controller detects a state that the break pedal is not operated, and in the state that the brake pedal is not operated, performs learning of a position or a movement reference point of the pressing member; and learning of the pressure sensor is performed at a higher frequency than learning of the reference point of the movement amount reference point.

According to the present invention, it is possible to detect correctly a reference point to be used for controlling an electrically driven brake booster or for detecting parameters. A detection precision or a control precision is therefore improved.

Other objects, features and advantages of the invention will become apparent from the following description of the embodiments of the invention taken in conjunction with the accompanying drawings.

BRIEF DESCRIPTION OF THE DRAWINGS

FIG. 5 is a flow chart illustrating a zero point learning operation.

DESCRIPTION OF THE EMBODIMENTS

Figure 1:
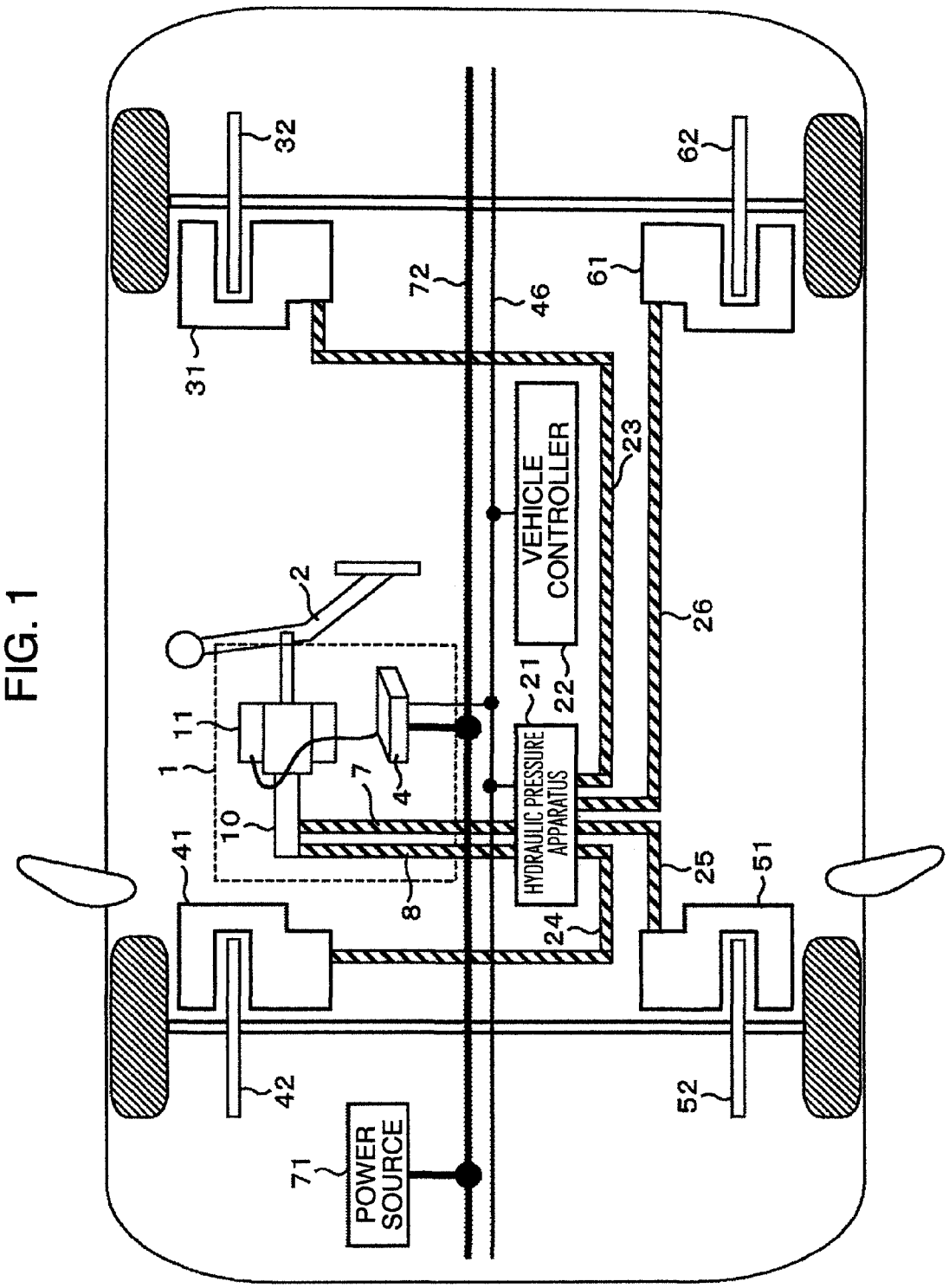
FIG. 1 is a block diagram illustrating a vehicle braking system applied to which is an electrically driven brake booster according to an embodiment of the present invention.

The embodiments of the present invention will now be described with reference to the accompanying drawings. FIG. 1 is a system diagram illustrating an embodiment of the present invention. Upon operation of a brake pedal 2 for controlling a running state of the vehicle, an electrically driven brake booster 1 operates and a master cylinder 10 generates a hydraulic pressure. The hydraulic pressure generated by the master cylinder 10 is transmitted to a hydraulic apparatus 21 via two pipes 7 and 8. The hydraulic apparatus 21 distributes the hydraulic pressure from the master cylinder 10 to calipers 31, 41, 51, and 61 provided at each wheel, via pipes 23, 24, 25 and 26. Each of the calipers 31, 41, 51, and 61 presses a friction member against a corresponding one of rotors 32, 42, 52, and 62 by a thrust force corresponding to a hydraulic force supplied to each of the calipers 31, 41, 51, and 61. A brake force is therefore applied to each wheel. A whole brake force of the vehicle is determined by the brake force generated by each of the calipers 21, 41, 51, and 61.

The hydraulic pressure apparatus 21 not only determines a hydraulic pressure to be supplied to each of the calipers 31, 41, 51, and 61 in accordance with the hydraulic pressure at the master cylinder 10, but also can control a hydraulic pressure to be supplied to each of the calipers 31, 41, 51, and 61 independently from the hydraulic pressure at the master cylinder 10 because the hydraulic pressure apparatus 21 is equipped therein with a hydraulic pump for generating a hydraulic pressure and an electromagnetic valve for controlling a hydraulic pressure. With this control, the hydraulic pressure apparatus 21 can control the vehicle stably by using Vehicle Dynamics Control (VDC), an Anti-lock Brake System (ABS), a Traction Control System (TCS) and the like.

As will be later described with reference to FIG. 2, the electrically driven brake booster 1 is equipped with the electrically driven actuator 11 and a controller 4 for controlling the electrically driven actuator 11. The controller 4 receives a DC power from a power source 71 via a power line 72, and converts the DC power into an AC power which is supplied to the electrically driven actuator 11. By controlling the AC power to be supplied to the electrically driven actuator 11, a rotation direction and a rotation torque can be controlled. In FIG. 1, although the electrically driven actuator 11 and controller 4 are discrete devices, the electrically driven actuator 11 and controller 4 may be integrated to realize the structure that the controller 4 is fixed to the electrically driven actuator 11.

The power source 71 may be a battery of, e.g., a 14-volt series or other series. A DC power may be supplied via a voltage converter such as a DC-DC converter.

The electrically driven brake booster 1 and hydraulic pressure apparatus 21 are often installed at separate positions in the vehicle, and information is transmitted/received via a vehicle communication series 46 by using electric signals of a time division multiplexing communication method. The type of an electric signal may be serial communications or multiplexing communications such as CAN, FlaxRay and LAN. For example, the vehicle power series 72 and vehicle communication series 46 may be structured in a multiplexing manner to prepare for the event of unlikely failure. For example, the vehicle power line 72 is constituted of independent two series, and each series may be equipped with a storage unit or a power generator unit as a power source. For example, the vehicle communication series 46 may be constituted of independent two series.

A vehicle controller 22 may be a device for controlling to change a running state such as an Intelligent Transport System (ITS). The vehicle controller 22 may be equipped with an outer world recognizing sensor such as a camera and a radar, or may acquire sensor information from a device equipped with an outer world recognizing sensor such as a camera and a radar. The vehicle controller 22 may operate in linkage to a navigation system or the like. If the vehicle controller 22 is a device having a role of controlling to change the running state, the electrically driven brake booster 1 generates a brake force necessary for changing the running state. Information on a necessary brake force or corresponding torque, hydraulic pressure and the like is transferred between the vehicle controller 22 and electrically driven brake booster 1 via the vehicle communication series 46, as a control request.

The vehicle controller 22 may be a device having a regeneration capability of converting a vehicle kinetic energy into an electric power. In an automobile driven by an internal combustion machine such as an engine and also by an electrically driven actuator, such as an electric car and a hybrid car, the electrically driven actuator is operated as a dynamo during deceleration by a brake operation, and performs a cooperation control with a regenerative brake for regenerating an electric power in a battery. If the vehicle controller 22 is a device having a regeneration capability, a brake force is applied to the vehicle by an amount corresponding to an electric power converted from a kinetic energy by regeneration. In this case, therefore, the electrically driven brake booster 1 controls the electrically driven actuator 11 in such a manner that a brake force caused by a hydraulic pressure is reduced by an amount corresponding to a brake force generated by regeneration, as compared to no regeneration. Information on a regeneration amount or a brake force, a torque, a hydraulic pressure and the like corresponding to the regeneration amount is transferred between the vehicle controller 22 and electrically driven brake booster 1 via the vehicle communication series 46.

Figure 2:
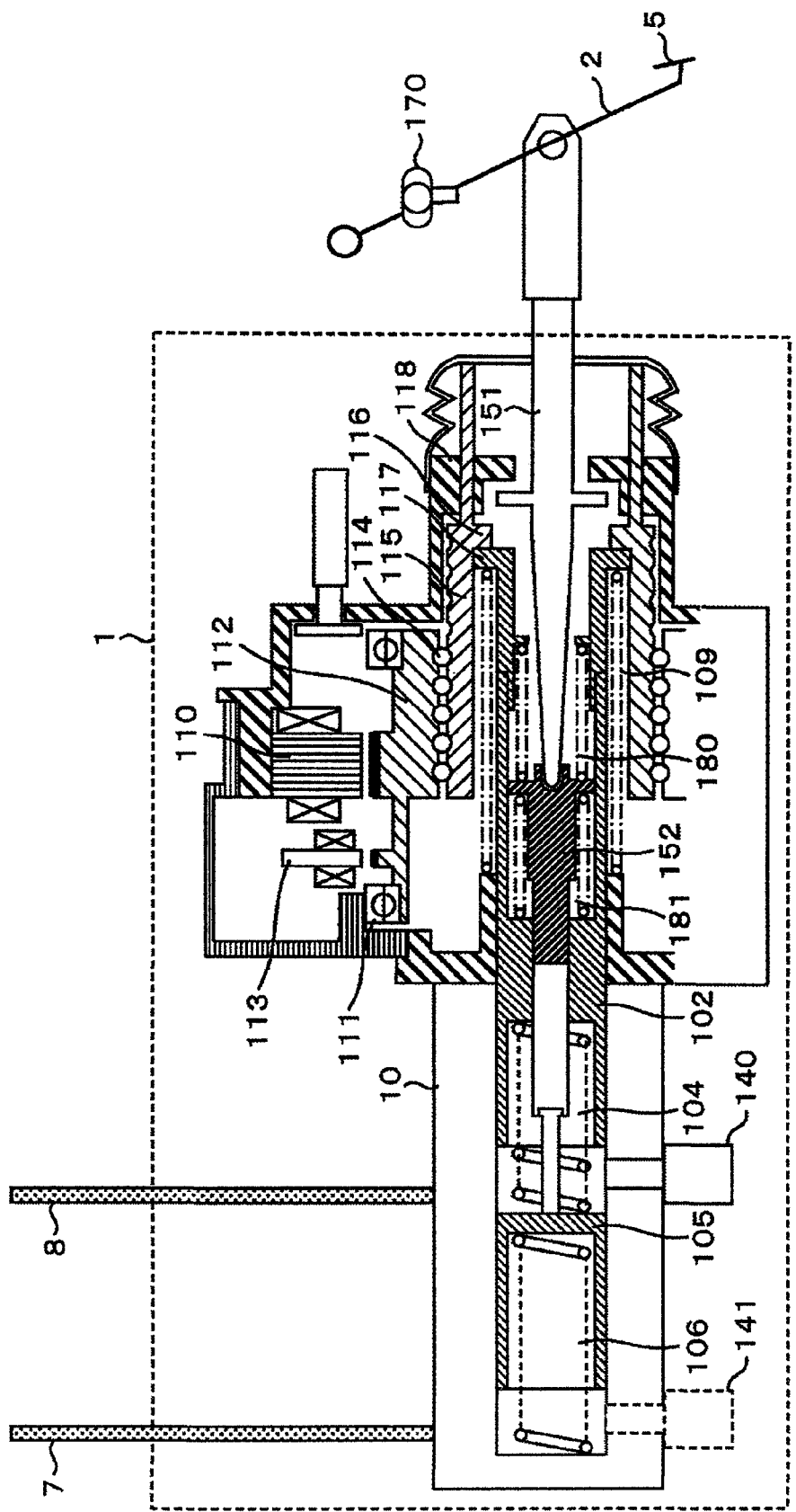
FIG. 2 is a partially broken cross sectional view of the electrically driven brake booster according to the embodiment of the present invention.

FIG. 2 is a partially broken cross sectional view of the electrically driven brake booster 1. In accordance with an operation of the brake pedal 2, an input rod 151 moves, and as the input rod 151 moves, an input piston 152 moves. In this embodiment, a booster piston 102 driven by an electrically driven actuator has a tubular shape, and the input piston 152 moves through the central area of the booster piston 102. The booster piston 102 and input piston 152 operate as a primary piston of the master cylinder 10, and as these pistons move to the left in the drawing figure, a hydraulic pressure in a primary liquid chamber 104 rises.

A stroke sensor 170 outputs information on an operation amount of the brake pedal 2. This information corresponds to a motion amount of the input rod 151. The controller 4 calculates a target hydraulic pressure of the master cylinder or a target position of the booster piston in accordance with a detection value of the stroke sensor 170 and a detection value of an oil pressure sensor 140 or 141. The electrically driven actuator is controlled in such a manner that a detection value of the hydraulic sensor 140 or 141 takes the target hydraulic pressure or an actual position of the booster piston takes the target position.

Rotation or torque of a rotor 112 of the electrically driven actuator moves a slide shaft 115 via balls 114 in a linear direction. A stopper 116 of the slide shaft 115 abuts upon a stopper 117 of the booster piston 102. As the slide shaft 115 moves to the left in the drawing figure, the booster piston 102 is pushed into the primary liquid chamber 104 of the master cylinder 10 so that an output liquid pressure of the master cylinder 10 rises. A secondary piston 105 moves in accordance with a liquid pressure in the primary liquid chamber 104, and the booster piston 102 stops at the position where a liquid pressure in the primary liquid chamber 104 becomes approximately equal to a liquid pressure in a secondary liquid chamber 106. Approximately the same liquid pressure is supplied from the primary liquid chamber 104 and secondary liquid chamber 106 of the master cylinder 10.

A spring 109 generates a force for retracting the stopper 117 of the booster piston 102, and can move the stopper 116 of the slide shaft 115 and the stopper 117 of the booster piston 102 to a stopper 118, while the electrically driven actuator 11 does not generate a torque. Springs 180 and 181 are provided between the input piston 152 and booster piston 102 to allow a force to be transmitted between the input rod and booster piston. The springs 180 and 181 operate as a set load for operating the input rod 151 toward a release side and returning the input rod 151 and input piston 152 to a zero point, while the booster piston 102 is not operated. In the cooperation control with the regenerative brake, it is controlled so that the electrically driven actuator is controlled to rotate in a direction retracting the booster piston 102 so that a brake force corresponding to the regenerative brake is reduced.

As the brake pedal 2 is stepped in, the input rod 151 and input piston 152 move to the left in the drawing figure. It is defined that a position of the input rod 151 or input piston 152 takes a larger value at the deeper position, and a smaller value at the shallower position. It is also defined that an operation of moving the brake pedal 2 from the front side to the back side is represented by "step", "step further" or "move forward". An operation of moving the brake pedal 2 from the back side to the front side is represented by "release" or "move backward".

The master cylinder 10 is a tandem type having two pressure chambers in this example, and is equipped with the primary liquid chamber 104 to be pressured by the primary piston 102 and the secondary liquid chamber 106 to be pressured by the secondary piston 105. As the booster piston 102 advances, the operation liquid pressured in the primary liquid chamber 104 and secondary liquid chamber 106 is supplied via the pipes 7 and 8 to the hydraulic pressure apparatus 21 to generate a brake force. The master cylinder 10 is equipped with a hydraulic pressure sensor 140 for measuring a hydraulic pressure in the primary liquid chamber and a hydraulic pressure sensor 141 for measuring a hydraulic pressure in the secondary liquid chamber. Since the primary liquid chamber and secondary liquid chamber of the electrically driven brake booster have the same hydraulic pressure, only one of the hydraulic pressure sensors 140 and 141 may be provided. The controller 4 may fetch a hydraulic pressure by the maser cylinder from the hydraulic pressure sensor 140 or 141. The hydraulic pressure apparatus 21 may acquire information supplied from the hydraulic pressure sensor, and the controller 4 may acquire hydraulic pressure information from the hydraulic pressure apparatus 21 via the vehicle communication series 42. A zero point of the master cylinder hydraulic pressure or a zero point of the hydraulic pressure sensor corresponds to a value while a hydraulic pressure is not applied to the master cylinder.

An electrically driven portion of the electrically driven actuator 11 is constituted of a stator 110 and a rotor 112 rotatably supported by a bearing 111, and a rotary position of the rotor 112 is detected with a rotation sensor 113. In this embodiment, the electrically driven actuator 11 is a permanent magnet type synchronous motor to be driven by three-phase currents, can obtain a large torque regardless of a compact side, and is most suitable for an electrically driven actuator used by a brake booster. It is obvious that the electrically drive actuator 11 may be an induction motor or a DC brushless motor in addition to the synchronous motor. In this embodiment, in order to make compact the brake booster, the inner circumferential space of the rotor 112 is void, and grooves meshing with one surfaces of the balls are formed on an inner circumferential surface of the rotor, and grooves are formed on the outer circumferential surface of the slide shaft 115. The stopper 116 is formed at an end of the slide shaft 115, one end of the stopper 116 abuts upon one end 117 of the booster piston 102 and the other end of the stopper 116 abuts upon the stopper 118 formed on the housing of the electrically driven actuator 11. Abut surfaces of the stopper 116 and booster piston 102 are arranged to be freely spaced apart by a force relation between the stopper and booster piston. The rotor 112 has permanent magnets, and a rotation torque is generated by a rotary magnetic field generated by the stator 110. The pole position of the rotor 112 is detected with a rotation sensor 113, and information detected with the rotation sensor is used for controlling current to be supplied to the stator 110 and controlling a position and speed of the booster piston 102.

The rotation sensor 112 is a sensor capable of detecting a rotation angle or phase of the electrically driven actuator 11. The rotation sensor 113 may be an optical or magnetic encoder or a resolver. The rotation sensor 113 is a sensor for detecting an angle, and can calculate a rotation amount of the rotor 112. It is possible to obtain a rotation amount of the rotor 112 from a predetermined zero point, i.e., a motion distance of the electrically driven actuator 11. A position of the electrically driven actuator is defined in such a manner that a direction of generating a hydraulic pressure at the master cylinder or increasing a hydraulic pressure is a forward or positive direction. A direction of decreasing a hydraulic pressure is a retracting or negative direction.

While the stoppers 116 and 118 of the electrically driven brake booster 1 don't abut each other, there is a predetermined relation between a position of the electrically driven actuator and a position of a pressing member (collectively representing the booster piston 102 and stopper 117), and the positions may be considered as the same. If the stoppers 116 and 118 abut together, the booster piston 102 will not move further in the retracting direction. However, it may be assumed that a position of the electrically drive actuator 11, i.e., rotor 112, can move in the negative direction. In this case, the controller 4 may control by assuming that the pressing member (collectively representing the booster piston 102 and stopper 117) retracts virtually from the zero point. The zero point of the electrically driven actuator or pressing member corresponds to the state that the master cylinder does not generate a hydraulic pressure in the state that current does not flow through the electrically driven actuator and the brake pedal 2 is not stepped. In the electrically driven brake booster, the position where the stoppers 116 and 118 abut together may be used as the zero point of the electrically driven actuator or pressing member. A value of the rotation sensor in this state may be used as the zero point of the rotation sensor.

The controller 4 is equipped with an inverter circuit for generating three-phase currents for driving the electrically driven actuator 11. The inverter circuit converts a DC current supplied via the power source path 72 from six switching elements or switching elements corresponding in number to a multiplication of "6", into three-phase currents for driving the electrically driven actuator 11. Three electrical paths may be used for supplying currents from the inverter circuit to the electrically driven actuator. The inverter circuit has current sensors for detecting currents flowing through the electrical paths. The current sensor may be realized by a Hall element, a current transformed or a shunt resistor. A zero point of current or a zero point of a current sensor corresponds to a value while current does not flow through the electrically driven actuator.

A stroke sensor 170 outputs information representative of a position of the input rod 151 and input piston 152 (these members are described as a shaft member). As a driver steps the brake pedal 2, the input rod 151 and input piston 152 (shaft member) are pressed to the left in the drawing figure, and this displacement is detected with the stroke sensor and input to the controller 4. Although the stroke sensor 170 is mounted on the brake pedal 2 in FIG. 2, the stroke sensor may be provided integrally with the electrically driven brake booster 1 or in the inside thereof, depending upon the system configuration. If the stroke sensor 170 is mounted on the brake pedal 2, a position of the shaft member can be calculated from a stroke amount of the brake pedal 2 because the geometrical relation between the brake pedal 2 and input rod is known, although the stroke sensor 170 is a sensor for detecting a stroke amount of the brake pedal 2. The stroke sensor 170 may be a rotation sensor or a direct movement sensor. The stroke sensor 170 may be a potentiometer using a variable resistor or a rotary encoder, may use a method of detecting a position with an optical pickup using a rotary slit, or may use a method of detecting a position by detecting a magnetic change with a magnetic element.

The zero points of the input rod 151 and input piston 152 (shaft member) correspond to the state that current is not supplied to the electrically driven actuator 11 and that the brake pedal 2 is not stepped. In this state, the master cylinder does not output a hydraulic pressure. However, the zero point may be determined by a predetermined criterion and maintained always under this condition. In the electrically driven brake booster 1, a position where the input rod 151 and stopper 118 abut together may be used as an origin, e.g., a zero point of the shaft member. An output value of the stroke sensor 170 in this state may be used as an origin, e.g., a zero point of the stroke sensor 170.

Important control values for the electrically driven actuator 11 include a position of the rotor 112 of the electrically driven actuator 11, a position of the shaft member, a hydraulic pressure to be output by the master cylinder 10, and a value of current to be supplied to the electrically driven actuator. An origin, e.g., a zero point of a position of the shaft member changes with assembly of the electrically driven brake booster 1, a mount precision of the stroke sensor, a temperature, a variation in read circuits of the controller, and a secular factor. The zero points of the hydraulic pressure sensor and current sensor change also with a temperature, a variation in read circuits of the controller, and a secular factor. Furthermore, since a position of the rotor 112 of the electrically driven actuator is calculated in accordance with an output from the rotation sensor, a zero point of the rotor 112 of the electrically driven actuator 11 is unknown immediately after the controller 4 is activated. In order to control the electrically driven actuator 11 correctly, it is important to perform zero point learning in real time and correct a sensor value by the learnt zero point.

Zero points of the stroke sensor 170, hydraulic pressure sensors 140 and 141 and a motor current measuring sensor are used as a reference for each target to be detected. Since these origins have a possibility of being shifted by various factors as described above, it is desired to detect a zero point correctly through learning. In this embodiment, the zero point learning condition is the condition described above. The learning condition is the condition that a driver does not step the brake pedal 2 and that a control request is not received from the vehicle communication series 46. If the hydraulic pressure apparatus 21 controls a hydraulic pressure, there is a possibility of a change in a hydraulic pressure of the master cylinder 10 and a position of the input rod 151, input piston 152 and pressing member. It is therefore desired to perform zero point learning while the hydraulic pressure apparatus 21 does not control a hydraulic pressure.

A zero point of the electrically driven actuator 11 or booster piston 102 (hereinafter called a pressing member where appropriate) can be learnt under the condition that the electrically driven actuator 11 or pressing member is moved to the retracting side in excess of a certain reference. Learning can be performed particularly when the electrically driven actuator 11 or pressing member reaches a movable limit position in the retracting direction.

In FIG. 2, the position where the stoppers 116 and 118 abut together may be used as a zero point. This position may be used as the movable limit position of the electrically driven actuator 11 or pressing member, and arrival at this position may be used as the learning condition. This condition is one of learning conditions, and other conditions may be used as the learning start condition. It is desired that how the satisfied learning condition can be judged. If arrival of the electrically driven actuator at the limit position is used as the start condition, it is advantageous in that it is easy to judge the learning condition. For example, the structure may be adopted in which as the stoppers 116 and 118 abut together and the electrically driven actuator rotates to the negative side, the stopper 117 moves to the left in the drawing figure and the position of the electrically driven actuator moves to the negative side.

A learning operation of a zero point of the position of the electrically driven actuator 11 can be performed in response to detecting that the electrically driven actuator 11 moving to the retracting side reaches the retracting operation limit, e.g., detecting a stop position of the electrically driven actuator. This operation sequence not only makes it easy to control but also improves control reliability.

If the zero point of the position of the electrically driven actuator is the same as the limit position, the zero point of the position of the electrically driven actuator uses a learnt value when the electrically driven actuator is at the limit position. If the zero point of the position of the electrically driven actuator is different from the limit position, the zero point of the position of the electrically driven actuator uses a value obtained by adding a specific value to a learnt value when the electrically driven actuator is at the limit position. This specific value is a difference between the zero point of the position of the electrically driven actuator and the limit position, and is determined by the structure of the electrically driven brake booster. The zero point of the position of the electrically driven actuator will not change after the controller is activated, and the sensor for detecting the position of the electrically driven actuator has almost or entirely no temperature condition drift. Therefore, if the zero point of the position of the electrically driven actuator is acquired once, it is not necessary to learn always but learning is performed only at a control start or under a particular condition while the controller is activated. An important point is to use a condition having a relation to the retracting operation limit, as a control origin. In this manner, control becomes easy and control reliability is improved.

In the structure that structural members of the electrically driven brake booster 1 always abut together under the condition that the shaft member (input rot 151 and input piston 152)

does not receive a thrust force from the brake pedal 2 and electrically driven actuator 11, if this abut state is used as the zero point learning condition, the structural members abut frequently. Namely, if electrically driven brake booster 1 applies a thrust force to the master cylinder 10 in response to a brake operation by a driver, an operation of the controller itself, or a control request from another controller, the booster piston 102 (hereinafter described as the pressing member) is moved in the forward direction by the electrically driven actuator 11. Next as a brake force generation control is terminated, the pressing member returns to the zero point when the structural members abut together. This structure makes the structural members abut frequently each time a brake operation is performed. With this structure, since the structural members abut frequently, there is a possibility of a shortened lifetime of the abutting structural members, and reliability is lowered. There is also a possibility that sounds generated upon abutment may cause some problem.

Since the learnt value of the zero point can be used many times, it is not necessary to perform zero point learning each time a brake operation is performed. In the running state without zero point learning, an operation of retracting the pressing member is not performed until the structural members abut as the learning condition, but as the pressing member is retracted to the position where a liquid pressure of the master cylinder 10 is not outputs, the retracting operation is stopped. The control judgment conditions are: (1) even under the condition that a brake operation is not performed, (2) a retract position of the pressing member is ultimately set to a standby position in front of an abut position of the structural members, not at a zero point learning timing of the pressing member. If the electrically driven actuator 11 is to be driven by a command from another controller, judgment is performed by adding a condition (3) that a drive command for the electrically driven actuator 11 is not issued from another controller, in addition to the conditions (1) and (2). The electrically driven actuator 11 is controlled in such a manner that the pressing member stops its movement at the standby position under the conditions (1) to (3).

The pressing member at the standby position is used as the zero point learning condition. At the start of a learning operation, the pressing member is moved from the standby position to the abut position of the structural members. In this manner, the electrically driven actuator or pressing member stops at the standby position in normal control for zero point learning, thereafter moving from the standby position to the negative side. With this control, the number of abutment times of the structural members becomes very small. In zero point learning, since the electrically driven actuator or pressing member retracts at a relatively slow speed, influence of abutment is small. Even if the pressing member is at the standby position, in this structure the master cylinder 10 generates substantially no hydraulic pressure. Namely, the primary liquid chamber 104 and secondary liquid chamber 106 of the master cylinder 10 are in a state connected to a reservoir (not shown). As the pressing member moves to the left in FIG. 2, connection among the primary liquid chamber 104, secondary liquid chamber 106 and reservoir is disconnected, and thereafter the operation enters a pressing operation state. After connection to the reservoir is disconnected, the master cylinder 10 outputs a pressure.

As the electrically driven actuator moves in the retracting direction over the limit position, there is a possibility that a large torque is generated because of abutment upon a stopper or the like, and that the structural members of the electrically driven brake booster 1 may be deformed or broken. In this embodiment, therefore, the limit value of the torque generated by the electrically driven actuator 11 is set to an allowable torque of the structural members or smaller by limiting a maximum torque value to be generated when the electrically driven actuator moves in the retracting direction.

In order not to judge the position of the zero point of the input rot 151 or input piston 152 as the position of the stepped brake pedal 2, learning is performed in this embodiment under the condition that the brake pedal 2 is not stepped. Although the judgment may be made only by an output value of the stroke sensor 170, the following operation is performed to further improve reliability. Namely, there is a fear that it becomes difficult to discriminate between that a drive steps slightly the brake pedal 2 and that the stroke sensor drifts. By dealing with this problem, reliability is further improved. In this embodiment, in the zero point learning operation, a set load applied to the input rod via the spring is changed by moving the pressing member. Generally, while the pressing member is at the zero point or standby position, a set load of several tens N is applied to the input rod 151 and input piston 152 in a release direction. It is therefore necessary to apply a force larger than the set load to the input rod 151 and input piston 152 in order for a driver to step and stroke the brake pedal 2. If the driver does not step the brake pedal 2, the positions of the input rod 151 and input piston 152 do not change unless the pressing member is moved in the forward direction farther from a certain motion amount. However, if the driver steps the brake pedal 2, the positions of the input rod 151 and input piston 152 change as the pressing member moves because the set load is cancelled out by a step force by the driver.

Figure 3:
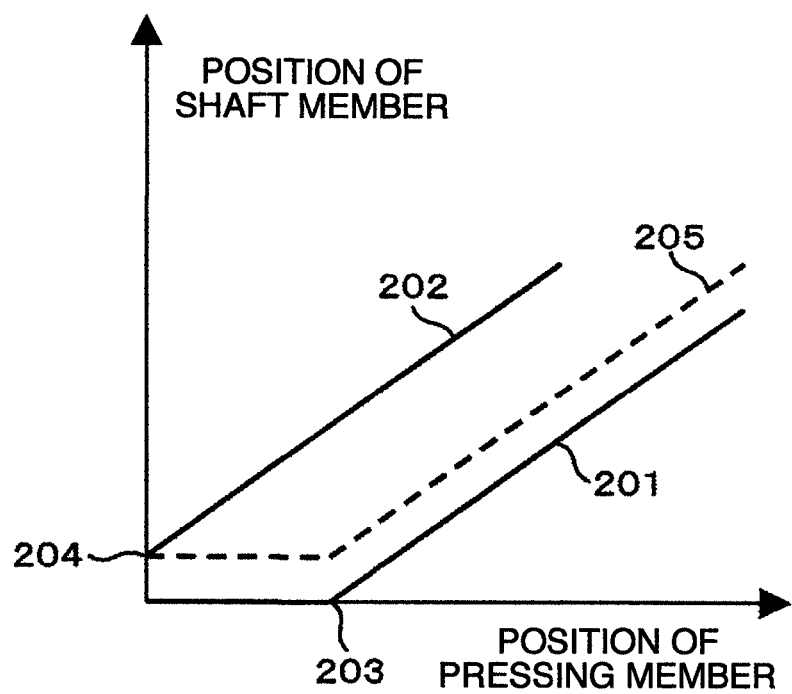
FIG. 3 is an illustrative diagram explaining judgment of whether a brake is operated or not, basing upon a positional relation between an axial member and a pressing member.

With reference to FIG. 3, description will be made on the principle of correctly detecting a judgment of whether a driver operates the brake pedal 2. Description will first be made on the state that a driver does not operate the brake pedal 2. First, description will be made on the state that brake control is not performed at all. In this case, since a drive current is supplied to the electrically driven actuator 11, the rotor 112 does not generate a rotation torque. Further, since the brake pedal 2 is not stepped, a thrust force by the brake pedal 2 is not operated upon the input rod 151 and input piston 152 as the shaft member. The springs 180 and 181 illustrated in FIG. 2 and provided between the booster piston 102 as the pressing member and the input rod 151 and input piston 152 as the shaft member determine the positional relation between the booster pin 102 as the pressing member and the input rod 151 and input piston 152 as the shaft member. In this state, as the brake pedal 2 is stepped slightly, the input rod 151 and input piston 152 as the shaft member move minutely toward the master cylinder 10 at the left in FIG. 2, and the state is established in which the spring 180 stretches minutely and the spring 182 contracts minutely. As the step operation of the brake pedal 2 is released, the input rod 151 and input piston 152 as the shaft member recover the original positions by the forces of the springs 180 and 181, and the forces of the springs 180 and 181 acting upon the shaft member are balanced.

As described above, it is difficult to discriminate between whether the brake pedal 2 is stepped slightly or whether there is influence of noises such as sensor drift. This discrimination is, however, very important to recognize the zero point correctly through zero point learning. As a method of correctly detecting whether the brake pedal 2 is slightly stepped, it is effective to use a detection method which moves slightly the booster piston 102 as the pressing member. With reference to FIG. 3, this detection method will be described.

FIG. 3 illustrates a relation between the positions of the input rod 151 and input piston 152 as the shaft member and the position of the pressing member when the pressing member is moved slightly to the master cylinder 10 side. A characteristic line 201 indicates the positional relation between the input rod 151 and input piston 152 as the shaft member and the booster piston 102 as the pressing member. As the electrically driven actuator 11 drives the pressing member to move it silently in the forward direction, the spring 180 stretches slightly and the sprint 181 contracts slightly. Although a pressing force of the spring 181 acting upon the shaft member increases, the shaft member does not move and is in a halt state because of a static friction or the like until the pressing member reaches a position 203. As the pressing member moves toward the master cylinder 10 over the position 203, the input rod 151 and input piston 152 as the shaft member start moving to follow the characteristic line 201.

A characteristic line 202 illustrates a positional relation between the pressing member and the shaft member in the state that the brake pedal 2 is stepped slightly. Since the brake pedal 2 is stepped slightly, the shaft member has already moved to a point 204 in FIG. 3, the spring 180 stretches slightly and the spring 181 contracts slightly. In this state, as the electrically driven actuator 11 drives the pressing member to move it in the forward direction silently, the input rod 151 and input piston 152 as the shaft member immediately follow a motion of the pressing member as illustrated by the characteristic line 202.

A characteristic line 205 illustrates the state that an output of the stroke sensor 170 is influenced by a drift or the like although the brake pedal 2 is not stepped. Because of the influence of a drift or the like, an output of the stroke sensor 170 is similar to the output when the brake pedal 2 is stepped slightly, and, for example, approximately at the point 204. However, since the brake pedal 2 is not stepped, forces of the springs 180 and 181 acting upon the shaft member are approximately the same. Next, as the booster piston 102 as the pressing member is moved quietly toward the master cylinder 10 by the electrically driven actuator 11, the spring 180 stretches gradually, the spring 181 contracts gradually, and a force of the spring 181 pressing the shaft member increases gradually. As the pressing member moves over the position 203, the shaft member starts moving. Therefore, the motion characteristics of the shaft member are as indicated by the characteristic line 205. Although the position 203 may shift slightly in each case, the fundamental characteristics are as described above.

Because of a difference between the characteristic lines 202 and 205 illustrated in FIG. 3, it is possible to correctly judge whether the brake pedal 2 is stepped even if a sensor output is shifted slightly. It is therefore possible to correctly detect the state that the brake pedal 2 is not stepped and perform zero point learning.

As described above, as the booster piston 102 as the pressing member is moved slightly by the electrically driven actuator 11, it becomes possible to correctly detect presence/absence of stepping of the brake pedal 2. It is desired that movement of the pressing member for this detection does not generate a hydraulic pressure of the master cylinder 10. The primary liquid chamber 104 and secondary liquid chamber 106 of the master cylinder 10 are coupled to the reservoir at the standby position of the booster piston 102 as the pressing member. As the pressing member moves by a predetermined distance, an oil path between the reservoir and the primary liquid chamber 104 and secondary liquid chamber 106 is disconnected and the liquid pressure starts rising. By limiting the movement of the pressing member for the detection in the range of not disconnecting the oil path, a rise in the liquid pressure by the detection can be suppressed. In the apparatus illustrated in FIG. 2, it is effective that a zero point as the reference point of the pressing member is set at the position retracted from the standby position of the pressing member, i.e., at the position toward the brake pedal 2.

In general brake force control, in the state that the brake pedal 2 is not stepped, it is desired that the booster piston 102 as the pressing member is held at the standby position where the master cylinder 10 does not generate a hydraulic pressure and that when zero point learning is performed, the booster piston 102 as the pressing member 102 is moved toward the brake pedal 2. In this manner, the learning operation is not adversely affected even response is made quick by a small play from a movement start of the booster piston 102 to the hydraulic pressure rise start by the master cylinder 10 during general brake force control. The number of abutment times of the abutment members can be made small, and the durability and reliability can therefore be improved.

As described above, since presence/absence of stepping of the brake pedal 2 can be detected correctly, it is possible to correct an output error of the stroke sensor 170 and an output error of the hydraulic pressure sensor 140 or 141 as illustrated by the characteristic line 205 in FIG. 3.

Figure 4A:
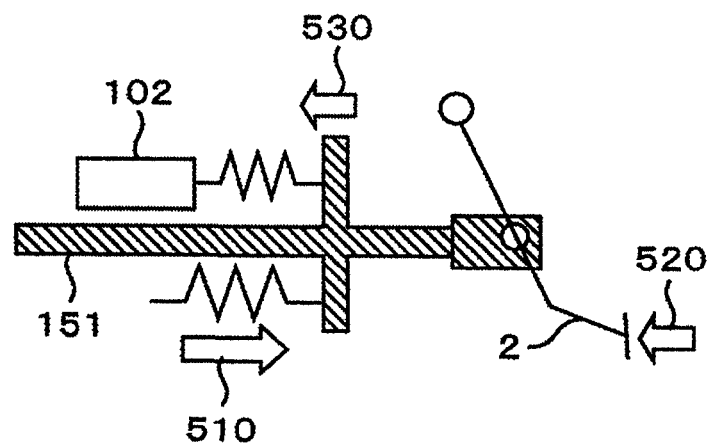
FIGS. 4A and 4B are illustrative diagrams explaining judgment of whether a brake is operated or not.

Next, with reference to FIGS. 4A and 4B, description will be made on the standby position $PP_S$ of the electrically driven actuator and a force relation and a position relation of the input rod 151 and booster piston 102. A preset load 510 is always applied in the release direction of the brake pedal 2, and as illustrated in FIG. 4A, the state that the brake pedal 2 is not stepped is represented by a step force $520=0<$the preset load 510. Even if the booster piston 102 is moved in the pressing direction, the input rod 151 maintains still at a predetermined position $IR_S$, in a range of a force 530 pulled by the booster piston 102<the preset load 510.

Figure 4B:
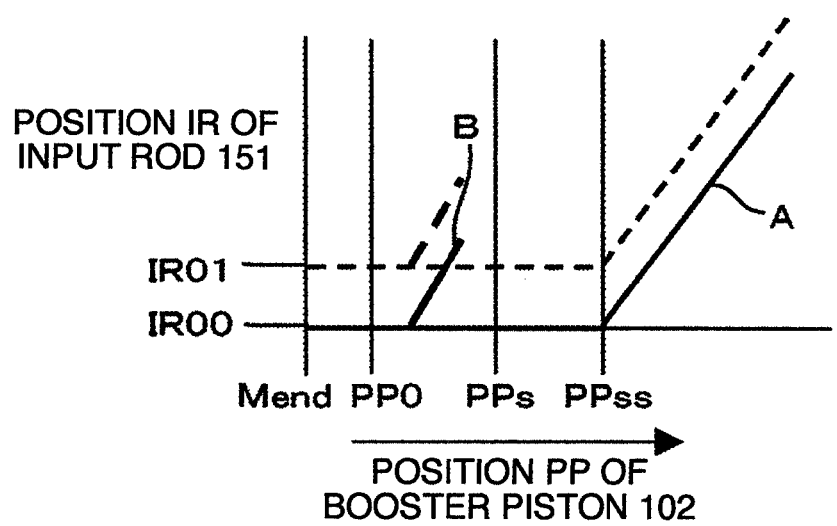

As illustrated in FIG. 4B, as the booster piston 102 is moved in the pressing direction (an arrow direction), the input rod 151 follows this movement and moves along a characteristic line A (corresponding to the characteristic line 201 in FIG. 3). This is the state that the brake pedal 2 is not stepped. In the state that a step force $520>$the preset load 510 while the brake pedal 2 is stepped, as the booster piston 102 is moved in the pressing direction, a pull force 530 generated by the movement of the booster piston 102 starts moving the input piston 152 and input rod 151 as the shaft member. The standby position $PP_S$ is set between a zero position PP0 of the booster piston 102 as the pressing member and a position $PP_{SS}$ at which the input rod 151 starts moving being slid by the booster piston.

In FIG. 4B, as the brake pedal 2 is stepped between the positions PP0 and $PP_{SS}$ of the electrically driven actuator, the input rod 151 starts moving. Since the booster piston 102 is only at the standby position $PP_S$, it is judged that the brake pedal 2 is stepped along the characteristic line B in which the input rod 151 moves between the positions PP0 and $PP_S$. In FIG. 4B, although the position of the input rod 151 is indicated by a zero position IR00, if a drift exists, the position of the input rod 151 indicated by the sensor output is illustrated by a dot characteristic line.

A zero point of the master cylinder is required to be learnt while a hydraulic pressure is not applied to the master cylinder. A zero point learning operation is therefore performed while the position of the electrically driven actuator is at the position retracted from the standby position.

A zero point of current of the electrically driven actuator is learnt while current is not flowed in the electrically driven actuator. A zero point is learnt while the controller turns off power supply to the electrically driven actuator. As the electrically driven actuator rotates, a voltage is induced by a magnetic field and current flows in the electrically driven actuator. It is therefore necessary to perform current zero point learning while the electrically driven actuator does not rotate. Since springs 109 are disposed in the electrically driven brake booster illustrated in FIG. 2, the electrically driven actuator does not rotate only when the position thereof is at the zero point, even if the controller turns off power supply. In this embodiment, when the electrically driven actuator is at the standby position, a current zero point cannot be learnt. Power supply from the controller is therefore turned off during the zero point learning operation to learn a zero point of the current.

Figure 6A:
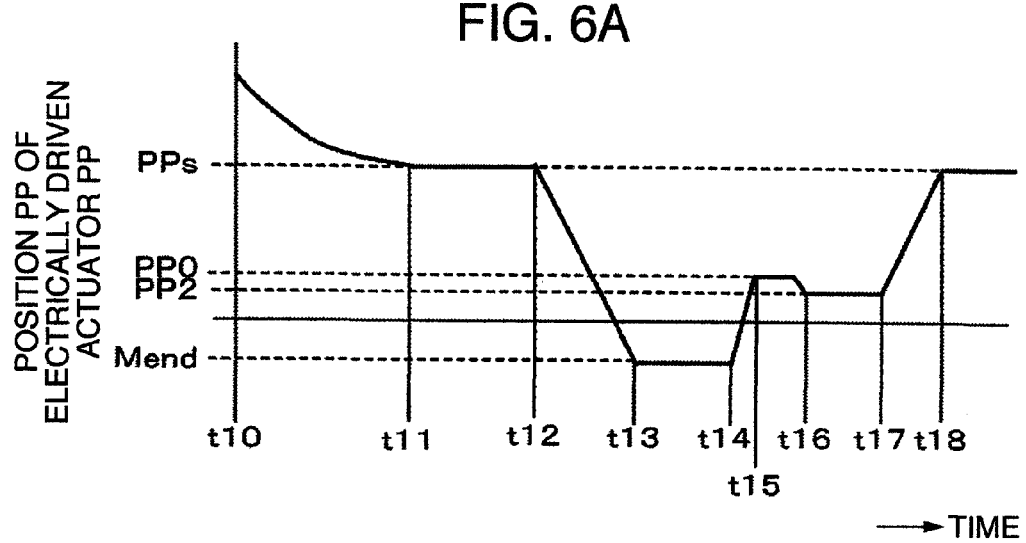
FIGS. 6A and 6B are illustrative diagrams explaining a positional relation state of an electrically driven actuator 11 during zero point learning.
Figure 6B:
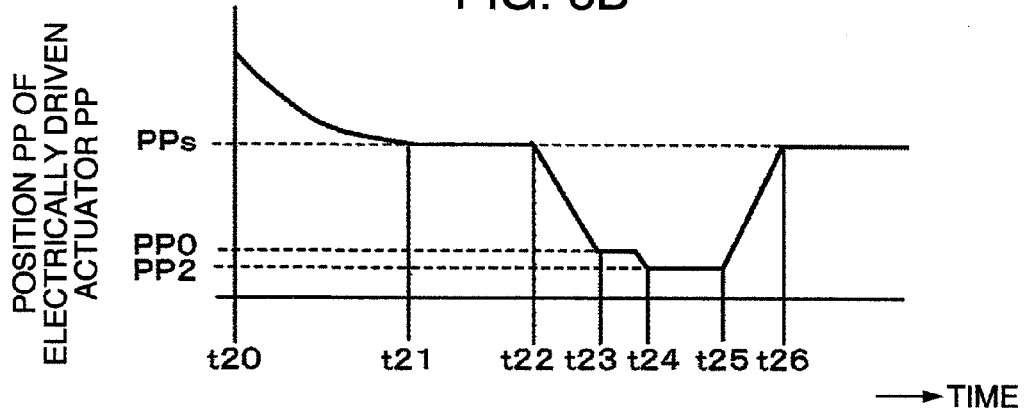

FIG. 5 and FIGS. 6A and 6B illustrate an example of zero point learning by the electrically driven brake booster illustrated in FIG. 2. FIG. 5 is a flow chart illustrating zero point learning. FIGS. 6A and 6B are diagrams illustrating a rotary position of the electrically driven actuator relative to a time lapse, i.e., illustrating a movement state of the position PP of the booster piston 102 as the pressing member.

The zero point learning flow of the electrically driven actuator 11 is constituted of a step S1 of judging a zero point learning start condition, a step SO of zero point learning, a Step SC of cancelling zero point learning and a step S11 of updating a learnt zero point value. The zero point learning operation SO is constituted of a zero point learning operation SOm of learning a zero point of a rotary position of the electrically driven actuator and a zero point learning operation SOp of learning a zero point of a sensor for detecting the positions of the input rod 151 and input piston 152, e.g., the stroke sensor 170, the oil pressure sensor 140 or 141 for detecting a pressure of an oil supplied from the master cylinder 10, a sensor for detecting a value of current to be supplied to the electrically driven actuator 11 and other sensors. A zero point learning start condition is judged at Step S1 repetitively until YES judgment is obtained for executing the zero point learning operation SO.

In the operation diagrams of FIGS. 6A and 6B, during a period from time t10 to t11 and a period from time t20 to t21, i.e., before time t11 and time t21, a brake force is generated and the position of the electrically driven actuator is moved in the retracting direction and then the brake force control is terminated. During a period from time t11 to t12 and a period from time t21 to t22, after the brake force control is terminated, the zero point learning start condition is judged. At the time t12 and time t22, the zero point learning start condition is satisfied (YES judgment). As the zero point learning start condition is satisfied (YES judgment) at Step S1, the zero point learning operation SO is executed. The details of the zero point learning will be described later.

At Step S2 of the zero point learning operation SO, at the time t12 in FIG. 6A or at the time t22 in FIG. 6B, the electrically driven actuator is moved in the retracting direction to pull back the pressing member and set a master cylinder hydraulic pressure to zero. There is therefore no influence of the master cylinder hydraulic pressure upon the zero point learning operation SOm and Sop.

With reference to the movement state of the position PP of the electrically driven actuator from time t12 to t14 in FIG. 6A, description will be made on Steps S3 to S5 of the zero point leaning operation SOm for the position of the electrically driven actuator. At the first Step S3, after the start of the retracting operation of the electrically driven actuator from the time t12, it is judged whether the zero point learning has been executed already for the position of the electrically driven actuator. It is sufficient if zero point learning for the rotary position of the electrically driven actuator or for the position of the booster piston 102 is performed once after the electrically driven brake booster is driven. Without performing the zero point learning repetitively, a detected zero point can be used a plurality of times. It is therefore possible to reduce the number of abutment times between the stopper 116 of the slide shaft 115 and the stopper 118 of the housing.

After the electrically driven brake booster is first driven, i.e., after a vehicle key switch is turned on and the electrically driven brake booster 1 starts operating, the zero point learning operation SOm is performed for the position of the electrically driven actuator if the zero point learning for the position of the electrically driven actuator did not performed in the past (NO judgment). If the zero point learning for the position of the electrically driven actuator was performed in the past (YES judgment), the flow advances to the zero point learning operation SOp. In response to NO judgment at Step S3, the retracting operation (Step S2) of the electrically driven actuator started at time t12 continues further to move to a limit position Mend. The limit position Mend of the electrically driven actuator is determined in the following manner. Even after the stopper 116 of the slide shaft 115 abuts upon the stopper 118 of the housing, because of the mount structure of the electrically driven actuator, the rotor 112 rotates slightly and pushed into the limit position Mend even the position PP of the electrically driven actuator is PP=0. This time corresponds to time t13 in FIG. 6A.

After the stopper 118 of the housing abuts at the position PP0 of the electrically driven actuator, a torque of the electrically driven actuator is applied to the structural member of the electrically driven brake booster at the position Mend. In order to reduce this impact, in the retracting operation of the electrically driven actuator starting at time t12, a retracting speed is set at a relatively low speed, e.g., a constant speed to limit current of the electrically driven actuator and not to apply an excessive torque to the structural member. Depending upon the structure of the electrically driven brake booster, the limit position Mend can be made coincident with PP=0. An operation other than the operation illustrated in FIG. 6A may also be adopted.

At a low temperature, there is an increase of viscosity of brake liquid and grease in the electrically driven brake booster. A movement time (time from time t12 to t13 in FIG. 6A) taken to reach the limit position Mend of the electrically driven brake booster (a position where the rotation of the electrically driven brake booster stops) may be prolonged or it may be unable to reach the limit position. Since a brake force cannot be generated during the zero point learning operation, it is judged at Step S4 whether the time taken to reach the limit position Mend of the electrically driven actuator exceeds a predetermined time. If NO judgment, the zero point learning operation SOm for the position of the electrically driven actuator is terminated.

At the limit position Mend of the electrically driven actuator from time t13 to t14 in FIG. 6A, a zero point (position PP0) of the electrically driven actuator is learnt at Step S5, and in accordance with the learnt value, the position PP of the electrically driven actuator and the zero point of the booster piston 102 are corrected. In the example of FIG. 6A in which the limit position Mend of the electrically driven actuator and the position PP0 of the electrically driven actuator are not coincident, a shift of the position PP0 from the zero point Mend of the electrically driven actuator is set to a predetermined value, and the position PP0 obtained by adding the predetermined value to the limit position Mend of the position of the electrically driven actuators is used as the zero point.

Next, the zero point learning operation SOp is performed. The zero point learning operation SOp is performed in two cases: when the zero point learning operation SOm for the position of the electrically driven actuator is completed at Step S5; or if the zero point learning operation SOm for the position of the electrically driven actuator has already been performed at Step S3 (YES judgment).

When the zero point learning operation SOm is completed, the position of the electrically driven actuator 11 is at the limit position Mend. If the limit value is different from the zero point, the position of the electrically driven actuator is moved to the zero point (PP0) at time t14 if necessary at Step S6. At Step S6, an SOm completion flag representative of SOm completion is set and used for judging at Step S3 whether the learning has already been performed.

After the zero point learning operation SOm for the position of the electrically driven actuator is completed, description will be made on Steps S7 to S9 in accordance with the movement state of the position PP of the electrically driven actuator 11 indicated from time t14 to t18 in FIG. 6A. At Step 7, the flow stands by until the position of the electrically driven actuator 11 takes the zero point (PP0). At Step S8, current of the electrically driven actuator is set to 0 during the period from time t15 to t16. PP0 is set by considering a component size tolerance of the electrically driven brake booster. As the current of the electrically driven actuator is set to 0, because of a balance between the pressing member and the spring, the position PP of the electrically driven actuator retracts and maintains still at a position PP2.

At the position PP2 where the electrically driven actuator maintains still from time t16 to t17, zero point learning is performed at Step S9 for zero points other than the position of the electrically driven actuator. Namely, learnt are a current of the electrically driven actuator, positions of the input rod 151 and input piston 152, and a zero point of a master cylinder hydraulic pressure. The values learnt at Step S9 are not used as correction values at Step S9, but the values are used as correction values only when the flow reaches Step S11.

The zero point learning started at Step S2 (time t12) is completed at Step S9 (time t17), and at Step S10 where the main sensor zero point learnt values are acquired, the electrically driven actuator is moved to the standby position PPs.

At time t18 when the electrically driven actuator takes the standby position PPs, the learnt values of the current, positions of the input rod 151 and input piston 152 and hydraulic pressure acquired at Step S9 are considered effective, and each sensor value is corrected by the learnt values at Step S11. The zero point learning operation of the electrically driven brake booster is completed at Step S11.

If the zero point learning operation OSm for the position of the electrically driven actuator has already been performed and a learnt value of the position of the electrically driven actuator has already been acquired, then Step S3 has YES judgment, and the zero point learning operation SOp is performed without performing the zero point learning operation SOm of the electrically driven actuator. Description will be made on Steps S7 to S10 of the zero point learning operation SOp with reference to the movement pattern of the position PP of the electrically driven actuator from time t22 to t26 in FIG. 6B. The process before t22 in FIG. 6B is the same as the process before time t12 in FIG. 6A, and executes Steps S1 and S2. The description thereof is therefore omitted.

At Step S7, the retracting operation of the electrically driven actuator starts at time t22 in FIG. 6B, and the electrically driven actuator moves by using the zero point PP0 of the position of the electrically driven actuator as a target value. The zero point PP0 of the position of the electrically driven actuator is always set to a true zero point or a point on the forward side of the true zero point, by considering a component size tolerance of the electrically driven brake booster. After the electrically driven brake booster is driven, the zero point learning operation SOp is performed each time the zero point learning start condition at Step S1 is satisfied. The retracting operation during time t22 to t23 is performed frequently, and depending upon the mount tolerance, the stopper 116 of the slide shaft 115 abuts upon the stopper 118 of the housing, and raspy impact sounds may be generated. The zero point PP0 is set to eliminate the impact noises and to reduce abrasion of the abutment portion. Time t23 when the electrically driven actuator moves to the position PP0 is the same as time t15 in FIG. 6B, and the operation after time t23 is the same as the operation after time t15 in FIG. 6A. Acquired at Step S9 (from time t24 to t25) are the learnt values of current, the positions of the input rod 151 and input piston 152. At Step S11 (from time t25 to t26), the electrically driven actuator moves to the standby position PPs, and at Step S11 (time t26), the sensor values are corrected by using learnt values to terminate the zero point learning of the electrically driven brake booster.

During a period from time t11 to t18 in FIG. 6A and during a period from time t21 to t26 in FIG. 6B, the state that the input rod 151 does not move in the state that a cancel condition of a zero point learning cancel step SC is not satisfied is judged as the state that the brake pedal 2 is not operated, and zero point learnt values are used at time t18 or t26.

The above-described zero point learning is required to be intercepted when an operation request for the electrically driven actuator 11 is issued.

At the zero point learning step SC in FIG. 5, it is judged whether a cancel condition of the zero point learning is satisfied, and in response to YES judgment, the zero point learning operation SO is intercepted to judge the zero point learning start condition at Step S1. The cancel condition of the zero point learning will be described later.

In the learning flow in FIG. 5, learning a reference point regarding the position of the electrically driven actuator 11, i.e., a reference point regarding the forward and backward movement of the booster piston 102 is thinned at Step S3 so that the number of execution times of learning the zero point of each sensor can be reduced. The hydraulic pressure sensors 140 and 141 and the current sensor have many factors influencing an output such as influence of a temperature, more than the sensor for measuring the reference point regarding the forward and backward movement of the booster piston 102. Therefore, learning the hydraulic pressure sensors 140 and 141 and the current sensor is repetitively performed at a particular cycle, and learning the reference point regarding the forward and backward movement of the booster piston 102 is reduced. For example, as in the embodiment illustrated in FIG. 5, as learning the reference point regarding the forward and backward movement of the booster piston 102 is performed once at the vehicle driving start, this learning is avoided to be performed repetitively during vehicle driving, and the learnt values acquired at the vehicle driving start are used repetitively. It is therefore possible to avoid executing unnecessarily and frequently learning of the reference point regarding the position of the electrically driven actuator 11, i.e., the reference point regarding the forward and backward movement of the booster piston 102.

Next, description will be made on a start condition of the zero point learning operation at Step S1. In the zero point learning operation, there is a possibility of reducing a generated brake force as the electrically driven actuator is moved in the retracting direction. If the brake pedal 2 is slightly stepped during the zero point learning operation, although the learnt values are not used for control, the start condition of the zero point learning operation is set by using each of the following conditions singularly or in arbitrary combination, in order to reduce a possibility of lowering a brake force in the learning operation itself as much as possible.

Condition 1: Immediately after the controller is driven, the zero point learning operation may be performed. This is because learnt zero point values are not acquired immediately after the controller is driven. As a vehicle key switch is turned on, a control computer (hereinafter described as CPU) used by the controller for control enters an operation start state. i.e., an active state. CPU judges whether the learning start condition in FIG. 5 is satisfied. The brake pedal 2 is often operated when the key switch is operated. For example, as an acceleration pedal is operated or as a mechanical parking brake is operated, the operation enters the state that the brake pedal 2 is not operated. It is judged at Step S1 whether the learning start condition is satisfied, and the step SOm is executed. The zero point as the reference point of the rotor 112 is updated as soon as possible after the vehicle starts so that brake force control can be realized at high reliability. In addition, the zero points of the hydraulic pressure sensor, current sensor, stroke sensor and the like are updated as soon as possible after the vehicle starts so that control reliability is improved. If the zero point has an abnormal value in excess of a prescribed range, it is considered that a measuring system including sensors is abnormal, and a zero point updating operation can be used for diagnosing an abnormal state.

Condition 2: If the state that no change in the positions of the input rod 151 and input piston 152 or the hydraulic pressure continues for a predetermined time, the zero point learning may be started. Whether there is a step by a driver cannot be judged from the values of the positions of the input rod 151 and input piston 152 or the hydraulic pressure, because of a sensor drift. However, if the values change, it is possible to judge without any error that there is a step by the driver. The state that the positions of the input rod 151 and input piston 152 or the hydraulic pressure do not change continues for a predetermined time becomes a start condition of the zero point learning. The predetermined time is defined herein as a time of several seconds to several tens seconds during which the vehicle is not under influence of pulling, sliding and the like. If the positions of the input rod 151 and input piston 152 or the hydraulic pressure have large values, there is a high possibility of a step rather than a drift so that it is effective to prolong the predetermined time. The predetermined time may be made variable in accordance with the positions of the input rod 151 and input piston 152 or the hydraulic pressure/

Condition 3: If the positions of the input rod 151 and input piston 152 are in a specific range, the zero point learning may be started. Although the zero points of the input rod 151 and input piston 152 may change with a sensor drift and a sensor mount error, these drift and error have a preset range. If the positions of the input rod 151 and input piston 152 or the value of the stroke sensor is in the specific range of the sensor drift and sensor mount error, this may therefore be used as the start condition of the zero point learning.

Condition 4: If a hydraulic pressure is in a range of a hydraulic sensor drift, the zero point learning operation may be started. A range of a hydraulic pressure is preset by a sensor drift range. If the hydraulic pressure or a value of the hydraulic pressure is in a specific range of a drift, a mount error and the like, this may therefore be used as the start condition of the zero point learning operation.

Condition 5: If a control request is not received from the vehicle controller 22, the zero point learning may be started.

Condition 6: If the hydraulic pressure apparatus 21 does not control a hydraulic pressure, the zero point learning operation may be started. If Vehicle Dynamics Control (VDC), Anti-lock Brake System (ABS) and Traction Control System (TCS) of the hydraulic pressure apparatus do not operate, the zero point learning operation may be started.

Condition 7: If the acceleration pedal is operated, the zero point learning operation may be started. The state that the acceleration pedal is stepped indicates an acceleration intension, it is considered that there is no operation of the electrically driven brake booster, and the zero point learning operation may be started.

Condition 8: If the vehicle runs at a constant speed or the vehicle is accelerated, it is considered that there is no operation of the electrically driven brake booster, and the zero point learning operation may be started.

Next, description will be made on the condition of the step SC (hereinafter described as cancel) for stopping the zero point learning operation. The cancel condition indicates a possibility that a brake control is fundamentally performed. This condition contradicts the start condition of the zero point learning operation at Step S1.

Even if the learning operation illustrated in FIG. 5 is under execution, since the control computer (hereinafter described as CPU) used by the controller 4 for control has an interrupt processing function equipped usually by CPU, if it is detected by the interrupt function that the condition is unsatisfied, the step SOm or step SOp is intercepted, and the flow immediately advances to the step SC. Of the start conditions for the zero point learning operation at Step S1, if any one of the conditions 3 to 8 is satisfied, it is considered that the cancel condition is satisfied and the zero point learning operation is intercepted. If the positions of the input rod 151 and input piston 152 or a hydraulic pressure changes, it is considered that the cancel condition is satisfied and the zero point learning operation is intercepted. When the learning operation is intercepted, a vehicle brake control is performed. When the learning operation starts next, although the remaining operation after interception may be executed, in this embodiment, the operation starting at the first Step S1 is performed again to improve reliability.

According to the above-described embodiment, the following advantageous effects can be obtained by the zero point learning operation by the electrically driven brake booster. In the zero point learning operation SO, after the operation start condition is satisfied in connection with the zero points of the electrically driven actuator position, the positions of the input rod 151 and input piston 152, hydraulic pressure and current, the electrically driven actuator is operated to learn the zero points, and after it is confirmed that there is no step of the brake pedal 2 by a driver, the sensor values are corrected by using the learnt values. In this manner, it becomes possible to perform brake force control in accordance with the correct zero points. By performing the zero point learning operation, it becomes possible to prevent brake force control by using erroneously learnt values, through discrimination between a sensor drift and a slight step by the driver.

In the electrically driven actuator 11 illustrated in FIG. 2 of the present embodiment, the booster piston 102 has the mechanism of cooperation of the slide shaft 115 for making the electrically driven actuator move forward and a push force by the spring 109. At the pushed position (in the rage from PP0 to $PP_{SS}$ in FIG. 4B) of the booster piston 102, it is judged that movement of the input rod 151 is judged as a step of the brake pedal 10. The present invention is not limited to the cooperation mechanism of the slide shaft 115 of the booster piston 102 and the spring 109.

For example, the electrically driven brake booster may have a mechanism that the input rod 151 and input piston 152 are integrated with the pressing member, and the integrated member is driven by the electrically driven actuator. In this mechanism, as the pressing member is moved, the input rod 151 and input piston 152 are also moved. In this mechanism, a set load for moving the brake pedal 2 in the release direction is propagated to the booster piston. In order to move the pressing member and the input rod 151 and input piston 152 in the forward direction, it is therefore necessary to generate a torque equal to or large than the set load. As the torque is generated in the forward direction of the electrically driven actuator, and if the input rod 151 and input piston 152 move, then it is judged that the driver stepped the brake pedal 2. Also in this case, the operation and effect similar to those of the first embodiment can be obtained. The essence of the present invention is characterized in that the electrically driven actuator is controlled in such a manner that it is possible to judge whether the driver steps the brake pedal 2. Even if a change in the input rod 151 and input piston 152 (integrated member) is judged by outputting only a torque, it does not contradict therefore the purpose of the present invention.

In order to control a liquid pressure supplied by the master cylinder 10, a target movement amount or target position of the booster piston 102 for generating a liquid pressure is obtained by the controller in accordance with an operation amount of the brake pedal 2, and the actual movement amount or the actual present position of the booster piston 102 is measured to control in such a manner that the actual movement amount or actual present position becomes equal to the target movement amount or target position. The actual movement amount or actual present position is obtained by counting the output of the rotation sensor 113 illustrated in FIG. 2. The rotation sensor 113 is, for example, a resolver which detects a magnetic pole of the rotor and counts a rotating number of the magnetic pole to obtain a rotation amount of the rotor 112. The rotation amount is in correspondence with a movement amount or present position of the booster piston 102, and can be obtained from the rotation amount. In order to obtain a correct movement amount or correct present position, an error of a reference point, i.e., a zero point, for performing counting corresponding to a unit rotation of the rotation sensor is to be removed. As in the above-described embodiment, a position of the booster piston 102 mechanically abutting the stopper 102 is used as the counting zero point or reference point, and the actual movement amount and actual present position relative to the targets can be obtained correctly. A control precision is therefore improved. The stroke sensor 170 and pressure sensor should deliver an output value of zero of a measurement object as the state that the brake pedal is not operated, and can measure a difference from a reference value of zero so that the value of a drift and an offset can be corrected precisely.

In the above-described embodiment, there is provided a mechanical reference position. In accordance with the mechanical reference position, a reference point for measuring a reference point of a rotation position of the electrically driven actuator 11 and a movement amount or position of the booster piston 102 are determined. It is therefore possible to detect the reference point correctly and easily.

The mechanical reference position corresponds to the stopper 116 in the embodiment. As the stopper 116 contacts the stopper 117 of the booster piston 102, it is configured in such a manner that the booster piston mechanically reaches the reference position. This detected position is used as the reference point, and in accordance with an output of the rotation sensor 113 as described above, a unit rotation amount of the rotor 112 is calculated so that a movement amount and present position of the booster piston 102 can be measured correctly. A measurement precision is therefore improved and a control precision is improved.

In the above-described embodiment, the stopper 116 is a fixed member whose position is determined because the electrically driven brake booster 1 is fixed to the vehicle body. The stopper 117 which contacts the fixed member is a moving body moving together with the pressing member. A movement amount of the moving member corresponds to a rotation amount of the rotor 112 of the electrically driven actuator 11. As the rotation sensor 113 output a signal corresponding to a unit rotation of the rotor 112, a count value of an output of the rotation sensor 113 corresponds to a movement amount of the moving member. The above-described embodiment adopts the structure that as the master cylinder 10 functions as a piston for generating a hydraulic pressure, the moving member moves together with the pressing member. In accordance with the mechanical relation between the moving member and fixed member, a zero point usable as the reference point is determined. Even a simple structure can obtain a high precision. By detecting that the moving member reaches the position of the fixed member, the zero point usable as the reference point is determined so that a reference point or zero point can be detected at a high precision.

A method of detecting that the moving member reaches the position of the fixed member can be realized in the following manner, as described in the embodiment. When the moving member reaches the position of the fixed member, the moving member is made to mechanically abut upon the fixed member, and the controller 4 detects that rotation of the rotor of the rotary machine stops due to the abutment, in accordance with an output of the rotation sensor 113.

As in the embodiment illustrated in FIG. 5, as the reference point regarding the forward and backward movement of the booster piston 102 is learnt once at the start of vehicle driving, this learning is avoided to be repetitively executed during vehicle driving, but the learnt values acquired at the vehicle driving start are used repetitively. It is possible to avoid learning the reference point regarding the position of the electrically driven actuator 11 and the reference point regarding the forward and backward movement of the booster piston 102, unnecessarily and frequently. The learning operation is executed repetitively at a predetermined cycle for the hydraulic pressure sensors 140 and 141 likely to be subjected to the influence of temperature. Reliability is therefore improved.

In the embodiment illustrated in FIG. 5, the SC operation of intercepting the learning operation is performed with a priority over the SOm and SOp as described above, so that reliability is improved. This preferential process is performed by using an interrupt function of CPU to be used by the controller 4, as described above. The preferential process can therefore be realized simply.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. An electrically driven brake booster comprising:
a master cylinder for generating a hydraulic pressure to be used for generating a brake force;
a pressing member for controlling a hydraulic pressure generated by said master cylinder;
a shaft member configured to be operated with said pressing member by force operating on a brake pedal to push the brake pedal back toward a release side when the pressing member is not operated, the force changing according to movement of said pressing member;

an electrically driven actuator for moving said pressing member forward and backward;

a sensor to be used for measuring a movement or a position of said shaft member; and a controller;

wherein:

said controller is configured to control said electrically driven actuator in accordance with an operation of the brake pedal to control a hydraulic pressure to be generated by said master cylinder; and said controller is configured to perform a learning operation to set a movement reference point for said shaft member, the learning operation comprising:

controlling said actuator to cause a movement of said pressing member, detecting the movement of said shaft member caused by the movement of said pressing member using said sensor, judging the presence/absence of an operation of the brake pedal in accordance with the detected movement of said shaft member so as to determine a state that the brake pedal is not operated, and setting a position of the shaft member as the movement reference point when it is judged that the pedal is not operated.

2. An electrically driven brake booster according to claim 1, further comprising:

a fixed member mounted on a fixed position; and a moving member for moving in correspondence with a movement of said pressing member;

wherein said fixed member has a first stopper provided along a movement axis of forward and backward movement of said pressing member;

said moving member has a second stopper moving together with said pressing member; and in said learning operation, said controller controls said electrically driven actuator to move said moving member in reverse direction of a pressure produced by said pressing member and said controller judges that said moving member has contacted said fixed member.

3. An electrically driven brake booster according to claim 2, wherein: said controller uses as a standby position a position of said pressing member where said master cylinder does not generate a hydraulic pressure for generating the brake force, and said second stopper is provided at a position more remote from said master cylinder than said standby position; and when the brake pedal is changed to the state that the brake pedal is not operated, said controller controls said electrically driven actuator to either move said pressing member to the position of said second stopper or make said moving member reach a position of said fixed member.

4. The electrically driven brake booster according to claim 1, wherein the controller is configured to perform the learning operation under a condition that a vehicle is accelerated.

5. The electrically driven brake booster according to claim 1, wherein the controller is configured to judge that the operation of the brake pedal is present when the electrically driven actuator drives the pressing member forward and the shaft member immediately follows the movement of the pressing member.

6. The electrically driven brake booster according to claim 5, wherein the controller is configured to judge that the operation of the brake pedal is absent when the movement amount of the shaft member is delayed until after the pressing member moves past a pressing member reference position.

* * * * *